(12) United States Patent
You et al.

(10) Patent No.: US 10,440,467 B1
(45) Date of Patent: Oct. 8, 2019

(54) VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventors: Jung Keun You, Suwon-si (KR); Jinmo Lee, Uiwang-si (KR); Kaangdok Yee, Yongin-si (KR); Jinseok Hong, Seongnam-si (KR); Joongkwan Kim, Hwaseong-si (KR); Jung Woo Choi, Daejeon (KR); Hyungjun So, Seoul (KR)

(73) Assignees: HYUNDAI MOTOR COMPANY, Seoul (KR); KIA MOTORS CORPORATION, Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/209,354

(22) Filed: Dec. 4, 2018

(30) Foreign Application Priority Data

Jul. 26, 2018 (KR) ........................ 10-2018-0087242

(51) Int. Cl.
*H04R 1/32* (2006.01)
*G10K 11/178* (2006.01)
*B60R 11/02* (2006.01)

(52) U.S. Cl.
CPC .......... *H04R 1/323* (2013.01); *B60R 11/0241* (2013.01); *G10K 11/178* (2013.01); *H04R 1/326* (2013.01); *G10K 2210/1282* (2013.01); *H04R 2499/13* (2013.01)

(58) Field of Classification Search
None
See application file for complete search history.

(56) References Cited

U.S. PATENT DOCUMENTS

| 9,847,081 B2 * | 12/2017 | Oswald | G10K 11/178 |
| 2010/0158263 A1 * | 6/2010 | Katzer | G10K 11/175 381/73.1 |
| 2015/0137998 A1 * | 5/2015 | Marti | B60Q 9/00 340/901 |

(Continued)

FOREIGN PATENT DOCUMENTS

JP 2015-101332 A 6/2015

*Primary Examiner* — Paul W Huber
(74) *Attorney, Agent, or Firm* — Brinks Gilson & Lione

(57) ABSTRACT

A method for controlling a vehicle relates to a voice masking technology for allowing only a specific passenger among passengers in the vehicle to listen to a voice communication signal such as a dial tone, and the technology inhibits the remaining passengers other than the specific passenger from listening to the voice communication signal. The vehicle includes a voice signal receiver to receive a voice signal, a speaker provided in the vehicle to output the voice signal, and a controller to perform frequency conversion of the received voice signal. In particular, the controller generates a masking sound for inhibiting transmission of information contained in the voice signal on the basis of a frequency band of the converted voice signal, and generates a control signal in a manner that the generated masking sound is output to a predetermined region of an indoor space of the vehicle.

13 Claims, 11 Drawing Sheets

(56) References Cited

U.S. PATENT DOCUMENTS

| | | | |
|---|---|---|---|
| 2015/0195641 A1* | 7/2015 | Di Censo | H04R 1/1083 381/71.6 |
| 2016/0071525 A1* | 3/2016 | Di Censo | H04S 7/30 704/226 |
| 2017/0316773 A1* | 11/2017 | Walther | G10K 11/175 |

* cited by examiner

400 : 401~406

400 : 401~406

VEHICLE AND METHOD FOR CONTROLLING THE SAME

CROSS-REFERENCE TO RELATED APPLICATION

This application claims priority to and the benefit of Korean Patent Application No. 10-2018-0087242, filed on Jul. 26, 2018, the entire contents of which are incorporated herein by reference.

FIELD

The present disclosure relates to a vehicle and a method for controlling the same, and more particularly to a voice communication technology.

BACKGROUND

The statements in this section merely provide background information related to the present disclosure and may not constitute prior art.

A vehicle is a machine which travels on roads or tracks to carry people or objects from place to place. Vehicles may move in various directions according to rotation of at least one wheel mounted to a vehicle body. Such vehicles may include, for example, a three-wheeled or four-wheeled vehicle, a two-wheeled vehicle such as a motorcycle, a motorized bicycle, construction equipment, a bicycle, a train traveling on rails, and the like.

In recent times, a vehicle has been designed to perform various functions (for example, a navigation function, a telephone function, an audio function, a radio function, a broadcast function, a text message service, an Internet function, etc.), and has been designed to include various kinds of software to realize more various and complex functions.

With development of automobile technology, as the technical demand of a driver or passengers who ride in the vehicle is rapidly increasing day by day, a technical development level of a communication technology between the vehicle and an external terminal such as a smartphone is also rapidly increasing.

If a specific user from among all in-vehicle passengers (including the driver and passengers who ride in the vehicle) desires to make a phone call to another party over Bluetooth communication, there is a high possibility that the remaining passengers other than the specific user unavoidably overhear a phone conversation between the specific user and another party, resulting in personal privacy violation.

In recent times, many developers and companies have conducted research on a new technology for isolating a sound output region or a sound destination region from other indoor space of a vehicle such that only a passenger located in the isolated sound output region or sound destination region can listen to a communication sound such as a dial tone that is emitted to the inside of the vehicle. In addition, a voice masking technology for allowing only a designated passenger to listen to a voice communication sound and preventing the remaining passengers other than the designated passenger from listening to the voice communication sound has also been researched.

SUMMARY

The present disclosure provides a technology for allowing only a specific passenger among all passengers who ride in a vehicle to listen to a voice communication signal such as a dial tone that is output to an indoor space of the vehicle, and preventing the remaining passengers other than the specific passenger from listening to the voice communication signal, such that user privacy in in-vehicle telephone communication can be protected.

Additional aspects of the present disclosure will be set forth in part in the description which follows and, in part, will be obvious from the description, or may be learned by practice of the present disclosure.

In accordance with an aspect of the present disclosure, a vehicle includes: a voice signal receiver configured to receive a voice signal; at least one speaker provided in the vehicle and configured to output the voice signal; and a controller configured to perform frequency conversion of the received voice signal, generate a masking sound for inhibiting transmission of information contained in the voice signal on the basis of a frequency band of the converted voice signal, and generate a control signal and cause the generated masking sound to be output to a predetermined region of an indoor space of the vehicle.

The controller may divide the indoor space of the vehicle into a plurality of regions based on a predetermined reference, and may cause the generated masking sound to be output to the predetermined region among the plurality of regions.

The controller may generate the control signal and cause the generated masking sound and the voice signal to be simultaneously output to the predetermined region of the indoor space of the vehicle through the at least one speaker.

The controller may amplify a magnitude of the voice signal having a predetermined frequency band or higher on the basis of the frequency band of the converted voice signal, thereby generating the masking sound.

The controller may generate the masking sound having the same magnitude as the voice signal having a predetermined frequency band on the basis of the frequency band of the converted voice signal.

The controller may amplify or reduce a magnitude of a voice signal having a predetermined frequency band on the basis of the frequency band of the converted voice signal, thereby generating the masking sound.

The controller may separate the frequency band of the converted voice signal, and may change a position of the frequency band of the separated voice signal, thereby generating the masking sound.

The at least one speaker may output the generated masking sound to the predetermined region of the indoor space of the vehicle.

In accordance with another aspect of the present disclosure, a method for controlling a vehicle includes: receiving a voice signal, performing frequency conversion of the received voice signal, generating a masking sound for inhibiting transmission of information contained in the voice signal on the basis of a frequency band of the converted voice signal, and generating a control signal and outputting the generated masking sound to a predetermined region of an indoor space of the vehicle.

The method may further include dividing the indoor space of the vehicle into one or more regions according to a predetermined reference, and outputting the generated masking sound to the predetermined region among the divided regions.

The method may further include controlling at least one speaker embedded in the vehicle to output the voice signal. The generating the control signal may include simultaneously outputting the generated masking sound and the voice signal to the predetermined region of the indoor space of the vehicle.

The generating the masking sound may include amplifying a magnitude of the voice signal having a predetermined frequency band on the basis of a frequency band of the converted voice signal, and thus generating the masking sound.

The generating the masking sound may include generating the masking sound having the same magnitude as the voice signal having a predetermined frequency band on the basis of the frequency band of the converted voice signal.

The generating the masking sound may include amplifying or reducing a magnitude of the voice signal having a predetermined frequency band on the basis of the frequency band of the converted voice signal, thereby generating the masking sound.

The generating the masking sound may include separating the frequency band of the converted voice signal, and changing a position of the frequency band of the separated voice signal, thereby generating the masking sound.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
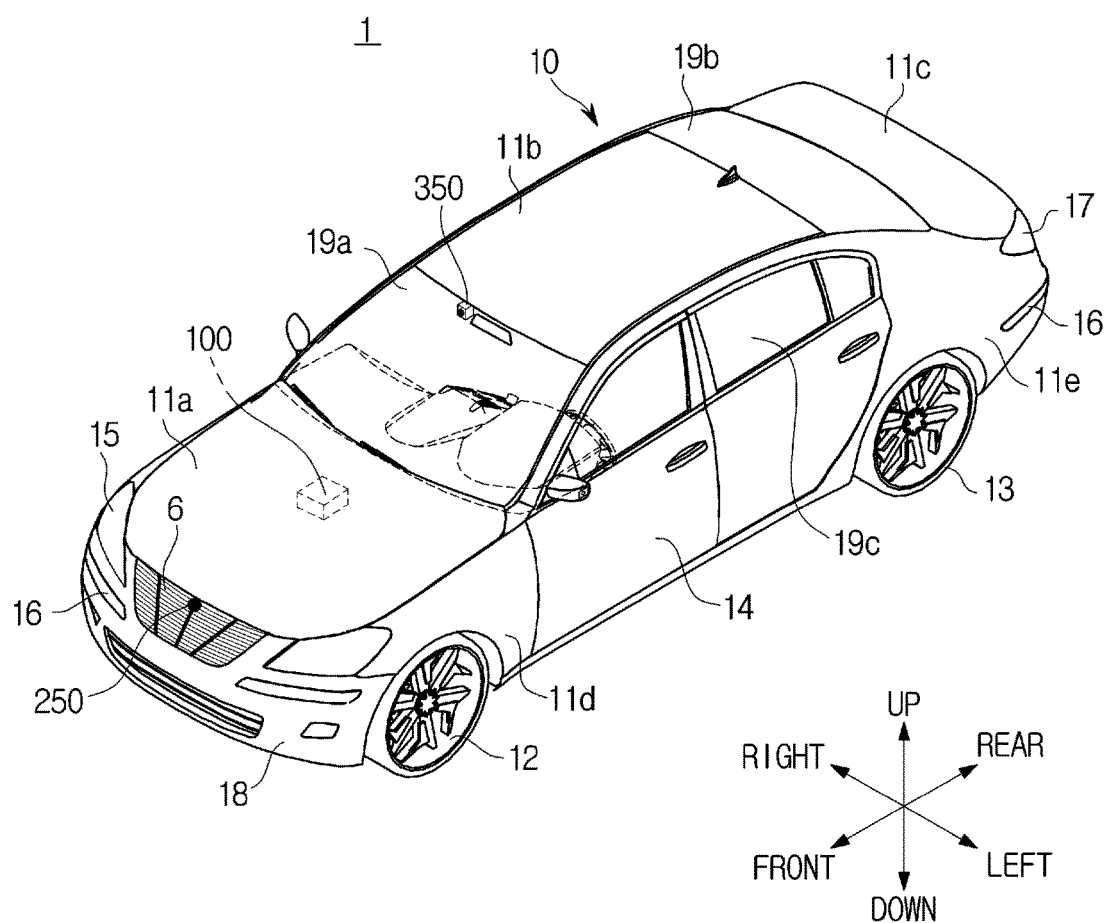
FIG. 1 is a view illustrating the appearance of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be noted that the present disclosure does not describe all the constituent elements of the forms, and general matters well known to those skilled in the art and redundant matters of the forms will not be described herein for clarity.

Throughout the specification of the present disclosure, terms " . . . part", " . . . module", " . . . member", " . . . block", and the like mean an element capable of being implemented by hardware, software, or a combination thereof. As used in the specification and appended claims, the term " . . . parts", " . . . modules", " . . . members", or " . . . blocks" may be implemented by a single constituent element, or the term " . . . part", " . . . module", " . . . member", or " . . . block" may include a plurality of constituent elements.

Throughout the present disclosure, if it is assumed that a certain part is connected (or coupled) to another part, the term "connection or coupling" means that the certain part is directly connected (or coupled) to another part and/or is indirectly connected (or coupled) to another part. Here, indirect connection (or indirect coupling) may conceptually include connection (or coupling) over a wireless communication network.

Throughout the present disclosure, if it is assumed that a certain part includes a certain component, the term "comprising or including" means that a corresponding component may further include other components unless context clearly indicates otherwise.

In description of the present disclosure, the terms "first" and "second" may be used to describe various components, but the components are not limited by the terms. These terms may be used to distinguish one component from another component. For example, a first component may be called a second component and a second component may be called a first component without departing from the scope of the present disclosure. The term "and/or" may include a combination of a plurality of items or any one of a plurality of items.

The terms "a", "an", "one", "the" and other similar terms include both singular and plural forms, unless context clearly dictates otherwise.

Identification numbers for use in respective operations to be described later are used for convenience of description and better understanding of the present disclosure, do not describe the order or sequence of the respective operations of the present disclosure, and the respective operations of the present disclosure may be carried out in a different way from the order written in the present disclosure, unless context of each operation clearly indicates a specific order.

The principles of the present disclosure and the forms of the present disclosure will hereinafter be given with reference to the attached drawings. A vehicle and a method for controlling the same according to forms of the present disclosure will hereinafter be given with reference to the attached drawings.

FIG. 1 is a view illustrating the appearance of a vehicle 1 in one form of the present disclosure.

Referring to FIG. 1, the vehicle 1 may include a body 10 forming the appearance of the vehicle 1, and vehicle wheels 12 and 13 to move the vehicle 1 from place to place.

The body 20 may include a hood 11*a* to protect various constituent elements (such as an engine) needed to drive the vehicle 1, a roof panel 11*b* to form an indoor space of the vehicle 1, a trunk lid 11*c* provided with a storage space, a front fender 11*d* provided at a side of the vehicle 1, and a quarter panel 11*e* provided at a side of the vehicle 1. A plurality of doors 14 pivotably hinged to the body 1 may be provided at the side surfaces of the body 11.

A front window (hereinafter referred to as a windshield) 19*a* to provide a forward view of the vehicle 1 may be disposed between the hood 11*a* and the roof panel 11*b*. A rear window 19*b* to provide a rear view of the vehicle 1 may be disposed between the roof panel 11*b* and the trunk lid 11*c*.

Side windows (hereinafter referred to as windows) 19c to provide a side view of the vehicle 1 may be disposed at upper parts of the doors 14.

Headlights (also called headlamps) 15 to emit light in a traveling direction of the vehicle 1 may be provided at the front of the vehicle 1.

Turn signal lamps (also called turn signal indicators) 16 to indicate a traveling direction of the vehicle 1 may be provided at the front and rear of the vehicle 1.

The vehicle 1 may allow at least one of the turn signal lamps 16 to be repeatedly blinked in a desired traveling direction of the vehicle 1, such that drivers of peripheral vehicles of the vehicle 1 can visually recognize the traveling direction of the vehicle 1. Taillights (also called tail lamps) 17 may be provided at the rear of the vehicle 1. The taillights 17 provided at the rear of the vehicle 1 may indicate a gear shifting state and a brake operation state of the vehicle 1, etc.

The vehicle 1 may include a detection sensor 250. The detection sensor 250 may acquire position information of obstacles such as pedestrians located close to the vehicle 1. In more detail, the detection sensor 1 may acquire coordinate information of obstacles on the basis of the position of the vehicle 1.

The detection sensor 250 may be provided at a radiator grille 6 of the vehicle 1, and there is no limitation as to installation position and numbers of the detection sensor 250. For example, the detection sensor 250 may be implemented using various kinds of sensors, for example, a radar sensor configured to use millimeter waves (mmW) or microwaves, a Light Detection And Ranging (LiDAR) sensor configured to use pulse laser light, a vision sensor configured to use visible light, an infrared sensor configured to use infrared light, and an ultrasonic sensor configured to use ultrasonic waves. The detection sensor 250 may be implemented using any one of the above-mentioned sensors or a combination thereof.

At least one vehicle controller 100 may be provided in the vehicle 1. The vehicle controller 100 may perform an electronic control function associated with operation of the vehicle 1. The vehicle controller 100 may be installed at an arbitrary position inside the vehicle 1 according to selection of a system designer. For example, the vehicle controller 100 may be disposed between an engine compartment and a dashboard, or may also be disposed in a center fascia (also called a center console) of the vehicle 1. The vehicle controller 100 may include at least one processor for receiving an electric signal, processing the received electric signal, and outputting the processed electric signal. At least one processor may be implemented as at least one semiconductor chip and associated components. The at least one semiconductor chip and associated components may be mounted to a printed circuit board (PCB) capable of being installed in the vehicle 1.

At least one image capturing part 350 may be provided in the vehicle 1. The image capturing part 350 may capture peripheral images of the vehicle 1 during traveling or stopping of the vehicle 1, may detect the presence or absence of a pedestrian located close to the vehicle 1, and may acquire position information of the detected pedestrian.

Figure 2:
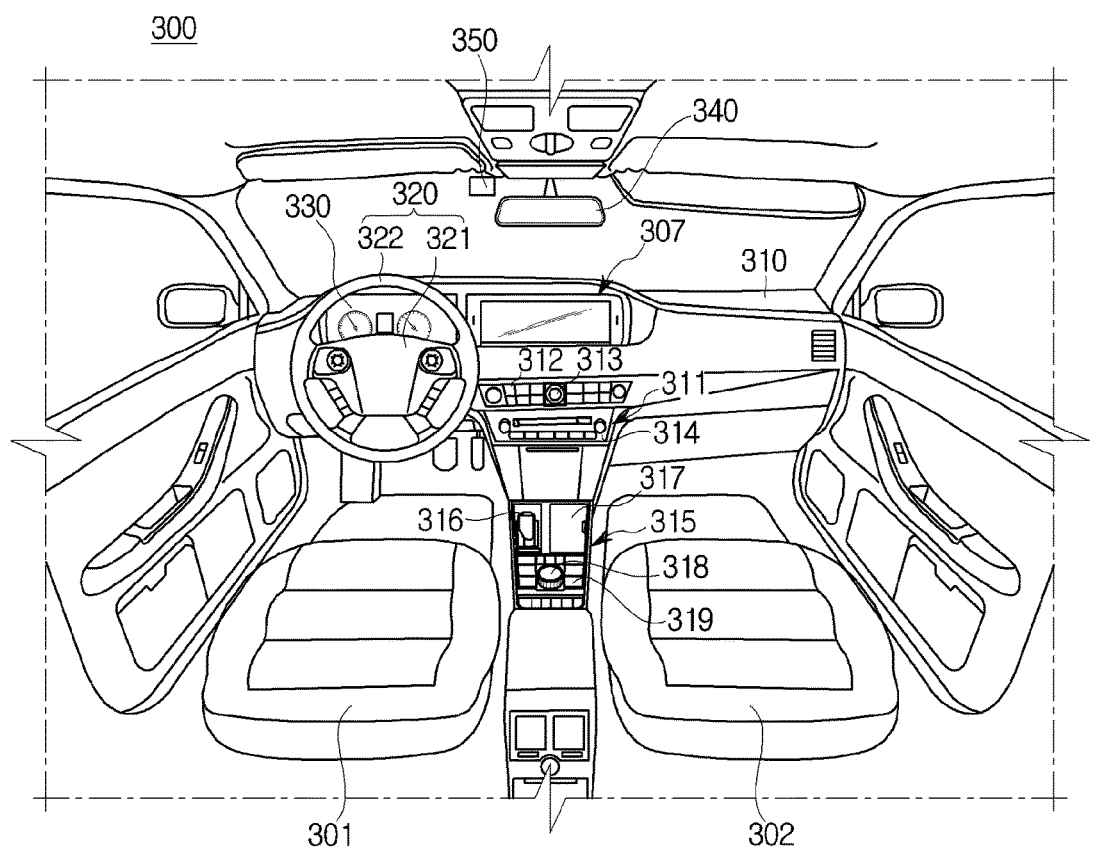
FIG. 2 is a view illustrating the internal structure of the vehicle.

FIG. 2 is a view illustrating the internal structure of the vehicle 1 in one form of the present disclosure.

Referring to FIG. 2, an indoor space 300 of the vehicle 1 may include a driver seat 301, a passenger seat 302, a dashboard 310, a steering wheel 320, and an instrument panel 321.

The dashboard 310 may allow the indoor space of the vehicle 1 and an engine compartment to be separated from each other, and may be a panel in which various kinds of components needed to drive the vehicle 1 are installed. The dashboard 310 may be arranged to face the driver seat 301 and the passenger seat 302. The dashboard 310 may include an upper panel, a center fascia 311, a gearbox 315, etc.

A display device 307 for use in the vehicle 1 (hereinafter referred to as a display device) may be installed at an upper panel of the dashboard 310. The display device 307 may display images thereon so as to provide the driver or passenger with various kinds of information using the displayed images. For example, the display device 307 may audio-visually provide the driver or passengers with maps, weather, news, music, various moving images or still images, and various kinds of information (e.g., air-conditioner information, etc.) associated with states or operations of the vehicle 1. In addition, the display device 307 may provide the driver or passengers with a warning message based on a dangerous condition. In more detail, when the vehicle 1 changes a current lane to another lane during vehicle driving, the display device 30 may provide the driver or passengers with different warning messages based on different danger levels. The display device 307 may also be implemented as a general navigation device as desired.

The display device 307 may be installed in a housing that is integrated with the dashboard 310 in one body. If desired, only a display panel contained in the display 307 may be designed to be exposed outside. In addition, the display device 307 may be installed at the center or lower end of the center fascia 311, or may be installed at an inner surface of a windshield or at the upper surface of the dashboard 310 using an additional support (not shown). The display device 307 may also be installed at various positions capable of being considered by the system designer.

Various kinds of devices, for example, a processor, a communication module, a Global Positioning Satellite (GPS) reception module, a storage device, and the like, may be installed in the dashboard 310. The processor may be configured to control various electronic devices embedded in the vehicle 1, and may be used to perform functions of the vehicle controller 100 as described above. The above-mentioned devices may be implemented using various components, for example, a semiconductor chip, a switch, an integrated circuit, a resistor, a volatile or non-volatile memory, a PCB, or the like.

The center fascia 311 may be installed at the center of the dashboard 310, and may include one or more input parts 312 to 314 for allowing a user to input various commands associated with the vehicle 1. The input parts 312 to 314 may be implemented using a physical button, a knob, a touchpad, a touchscreen, a stick-type manipulation device, a trackball, or the like. The driver may control various operations of the vehicle 1 using the input parts 311 to 314, 318, and 319.

The gearbox 315 may be located at a lower end of the center fascia 311, and may also be disposed between the driver seat 301 and the passenger seat 302. The gearbox 315 may include a gear shifter 316, a storage box 317, various input parts 318 and 319, etc. The input part 318 or 319 may be implemented using a physical button, a knob, a touchpad, a touchscreen, a stick-type manipulation device, a trackball, or the like. If desired, the storage box 317 and the input parts 318 and 319 may herein be omitted.

The dashboard 310 may be connected to the steering wheel 320 and the instrument panel 321 that are arranged to face the driver seat.

The steering wheel 320 may be rotatable in a predetermined direction according to the driver's manipulation, and front wheels or rear wheels of the vehicle 1 may rotate in the rotation direction of the steering wheel 320, such that the vehicle 1 can be steered in a driver-desired direction. The steering wheel 320 may include a spoke 321 connected to a rotation shaft, and a knob wheel 322 connected to the spoke 321. The spoke 321 may also include at least one input part for receiving various commands from a user such as the driver. The input part may be implemented using a physical button, a knob, a touchpad, a touchscreen, a stick-type manipulation device, a track ball, or the like. Although the knob wheel 322 may be formed in a circular shape for convenience of the driver, the shape of the knob wheel 322 is not limited thereto. A vibration unit may be installed in at least one of the spoke 321 and the knob wheel 322, such that at least one of the spoke 321 and the knob wheel 322 may vibrate with a predetermined strength upon receiving a control signal from an external part. In one form, the vibration unit may vibrate with various strengths according to an external control signal, such that at least one of the spoke 321 and the knob wheel 322 may vibrate with various strengths according to an external control signal. The vehicle 1 may provide the driver with a haptic warning message using such vibrations of the vibration unit. For example, at least one of the spoke 321 and the knob wheel 322 may vibrate with a strength corresponding to a danger level decided by lane change of the vehicle 1, such that various warning messages can be provided to the driver. In more detail, the higher the danger level of the vehicle 1, the higher the vibration strength of at least one of the spoke 321 and the knob wheel 322, such that the vehicle 1 may provide the driver with a higher-level warning message using the stronger vibrations.

The instrument panel 330 may be configured to provide the driver with various kinds of information of the vehicle 1, for example, a vehicle speed, an engine rpm, a residual fuel quantity, an engine oil temperature, blinking or non-blinking of a turn signal indicator, a mileage indicator, etc. The instrument panel 330 may be implemented using lamps, scale marks, or the like, or may also be implemented using a display panel in one form. If the instrument panel 330 is implemented using the display panel, the instrument panel 330 may display not only the above-mentioned information, but also more various information (e.g., fuel efficiency, execution or non-execution of various functions embedded in the vehicle 1, and the like) using the display panel, such that the driver can easily recognize the displayed information. In one form, the instrument panel 330 may output different warning messages based on different danger levels of the vehicle 1, and may provide the different warning messages to the driver. In more detail, when the vehicle 1 changes a current lane to another lane during driving on the road, the instrument panel 330 may provide the driver with a warning message corresponding to the decided danger level.

A rear-view mirror (also called a room mirror) 340 may be provided at an upper end of the indoor space of the vehicle 1, and may allow the driver to see the indoor space of the vehicle 1 as well as to see what is happening behind the vehicle 1.

As described above, at least one image capturing part 350 may be provided in the indoor space of the vehicle 1. Although the image capturing part 350 of FIG. 2 is located close to the rear-view mirror 340, the image capturing part 350 may also be provided at any position where image information can be acquired by the image capturing part 350 designed to capture inside or outside images of the vehicle 1. The image capturing part 350 may capture peripheral images of the vehicle 1 during traveling or stopping of the vehicle 1, may detect the presence or absence of a pedestrian located close to the vehicle 1, and may thus acquire position information of the detected pedestrian.

The image capturing part 350 may include at least one camera. In order to more clearly capture images, the image capturing part 350 may include a three-dimensional (3D) space recognition sensor (e.g., a 3D laser range finder (LRF) sensor), a radar sensor, an ultrasonic sensor, etc.

The 3D space recognition sensor may include a Kinect RGB-D sensor, a time-of-flight (TOF) sensor (i.e., a structured light sensor), a stereo camera, etc. without being limited thereto, and may further include other similar devices as desired.

Figure 3:
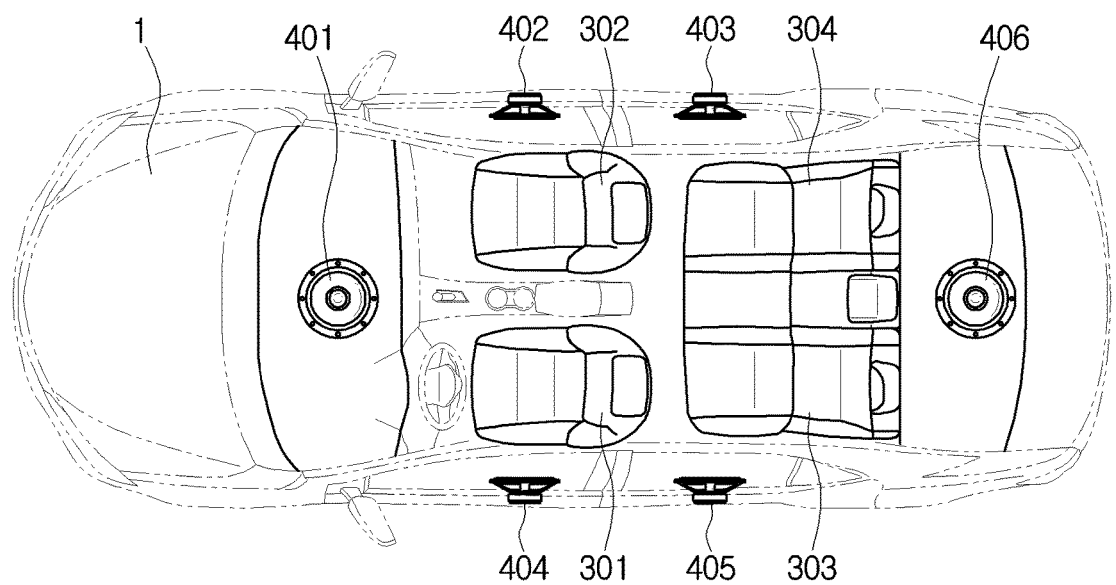
FIG. 3 is a view illustrating speakers installed in an indoor space of the vehicle.
Figure 4:
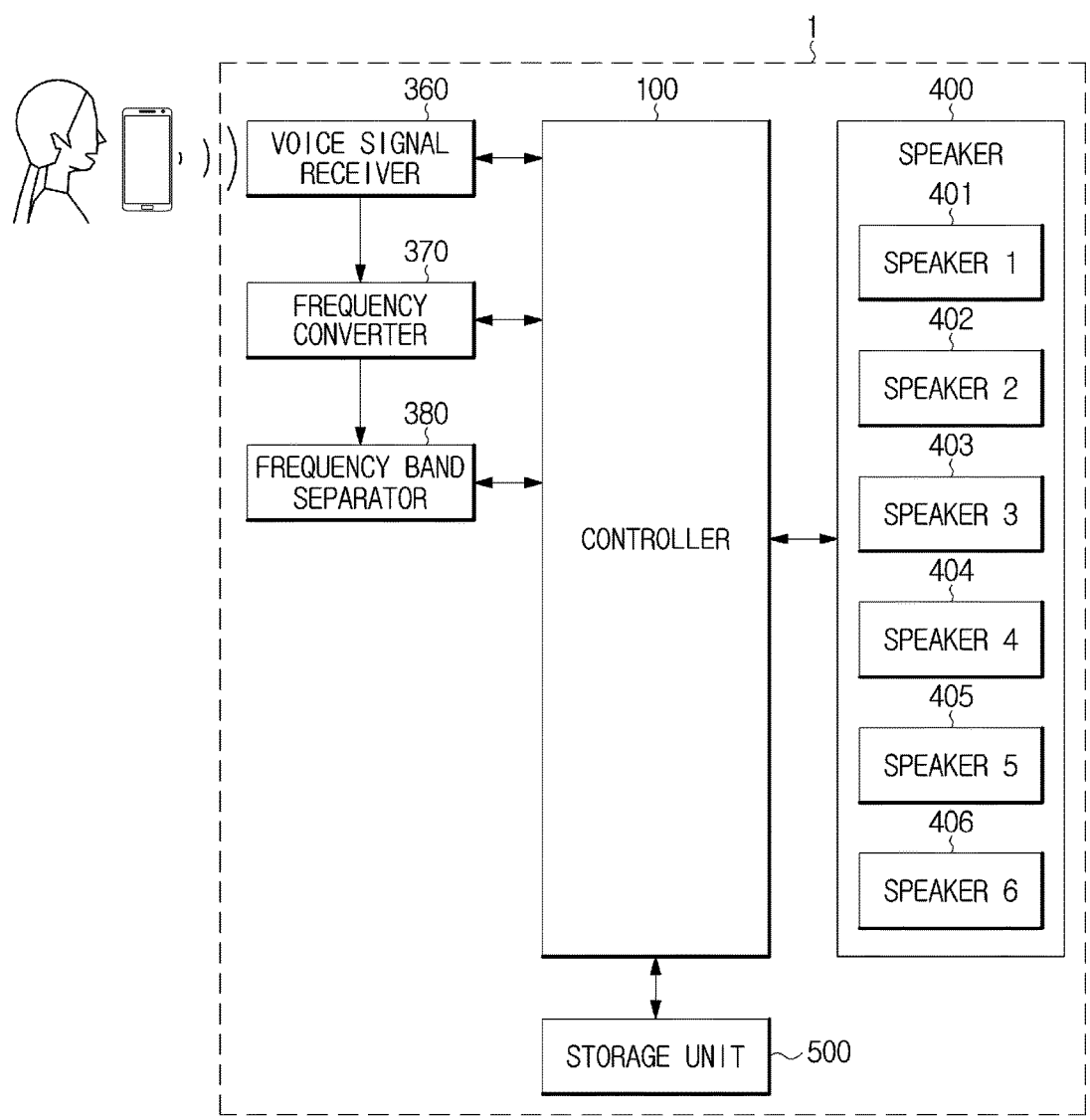
FIG. 4 is a block diagram illustrating the vehicle in one form of the present disclosure.
Figure 5:
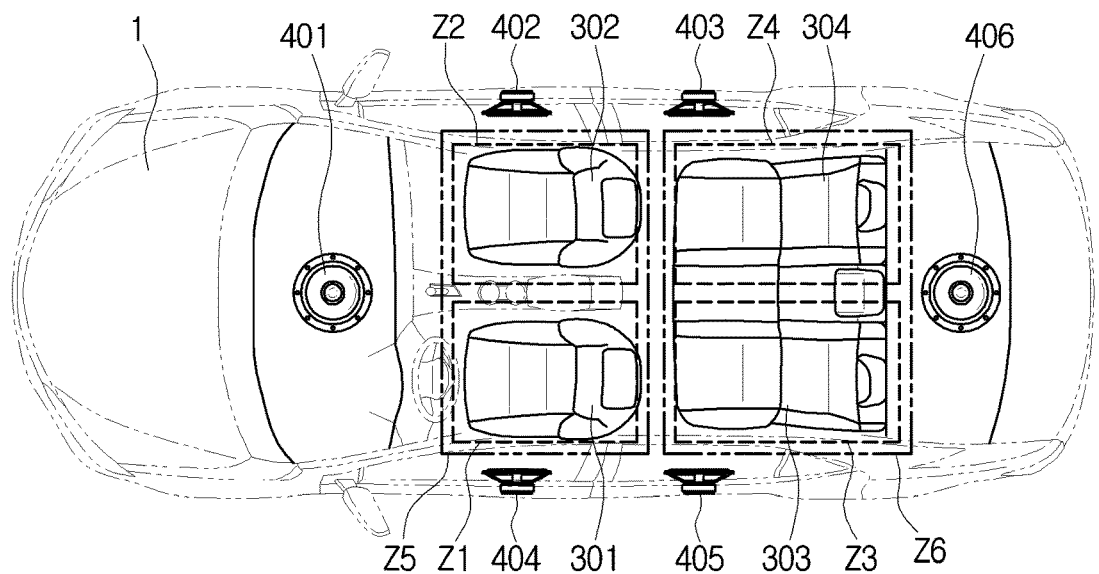
FIG. 5 is a conceptual diagram illustrating a plurality of regions formed by division of an indoor space of the vehicle.

FIG. 3 is a view illustrating speakers installed in an indoor space of the vehicle in one form of the form of the present disclosure. FIG. 4 is a block diagram illustrating the vehicle in one form of the present disclosure. FIG. 5 is a conceptual diagram illustrating a plurality of regions formed by division of the indoor space of the vehicle in one form of the present disclosure.

Referring to FIG. 3, the indoor space of the vehicle 1 may be provided with at least one speaker 400 designed to output a sound signal.

At least one speaker 400 may be installed at arbitrary positions of the indoor space of the vehicle 1, and the number of the speakers 400 and the installation position of the speakers 400 are not limited thereto.

At least one speaker 400 may be provided in the vehicle 1, may generate constructive interference or destructive interference about a low-frequency sound signal or a medium-to-high frequency sound signal, and may output the resultant sound signal. That is, the sound output effect in which a sound signal is output only to a predetermined region of the indoor space of the vehicle 1 may be changed according to the number and arrangement of speakers 400. There are various forms of the number and arrangement of the speakers 400.

Referring to FIG. 3, six speakers 401 to 406 may be provided in the vehicle 1. That is, the speakers 400 may include a first speaker 401 provided at the front surface of the indoor space of the vehicle 1, a sixth speaker 406 provided at the rear surface of the indoor space of the vehicle 1, a fourth speaker 404 disposed close to the driver seat 301, a fifth speaker 405 disposed close to a back seat 303 located behind the driver seat 301, a second speaker 402 disposed close to a passenger seat 302, and a third speaker 403 disposed close to a back seat 304 located behind the passenger seat 302.

The controller 100 may generate a control signal needed to output various signals, for example, a music playback signal, a moving-image playback signal, a voice communication signal, a navigation information signal, and various warning signals. At least one speaker 400 may output a sound signal to the indoor space of the vehicle 1 upon receiving the control signal from the controller 100.

The controller 100 may control a navigation device and an audio video navigation (AVN) device that are embedded in the vehicle 1, and may generate a control signal in a manner that at least one speaker 400 can output a sound signal in response to the image that is output from the navigation device or the AVN device.

The sound signal capable of being output from the speakers 400 may include music, a voice communication sound, a navigation information sound, and various warning signals, etc. In addition, various kinds of sound signals can be output through the speakers 400 as desired.

If a user who rides in the vehicle 1 makes a phone call to another party over Bluetooth communication, the remaining passengers other than the user may unavoidably listen to telephone conversation between the user and another party, resulting in user's privacy violation.

Therefore, the controller 100 may control a voice signal output from at least one speaker 400 to be output only to a specific region of the indoor space of the vehicle 1, and may prevent the voice signal from being output to the remaining regions other than the specific region, such that the controller 100 can allow only a specific passenger who is present in the specific region to listen to telephone conversation.

However, regardless of the above-mentioned control of the speakers 400 using the controller 100, there is a high possibility that the voice signal may be unexpectedly output not only to the specific passenger, but also to the remaining passengers other than the specific passenger. In this case, there is a need for the voice signal to be prevented from being output to the remaining passengers other than the specific passenger.

Referring to FIG. 4, the vehicle 1 may include the controller 100, a voice signal receiver 360, a frequency converter 370, a frequency band separator 380, a speaker module 400, and a storage unit 500. The controller 100 may provide overall control to operations of the vehicle 1. The voice signal receiver 360 may receive a voice signal from an external part of the vehicle 1. The frequency converter 370 may perform frequency conversion on the received voice signal. The frequency band separator 380 may separate a frequency band of the voice signal. The speaker module 400 may output the voice signal. The storage unit 500 may store data associated with control of the vehicle 1.

Figure 6:
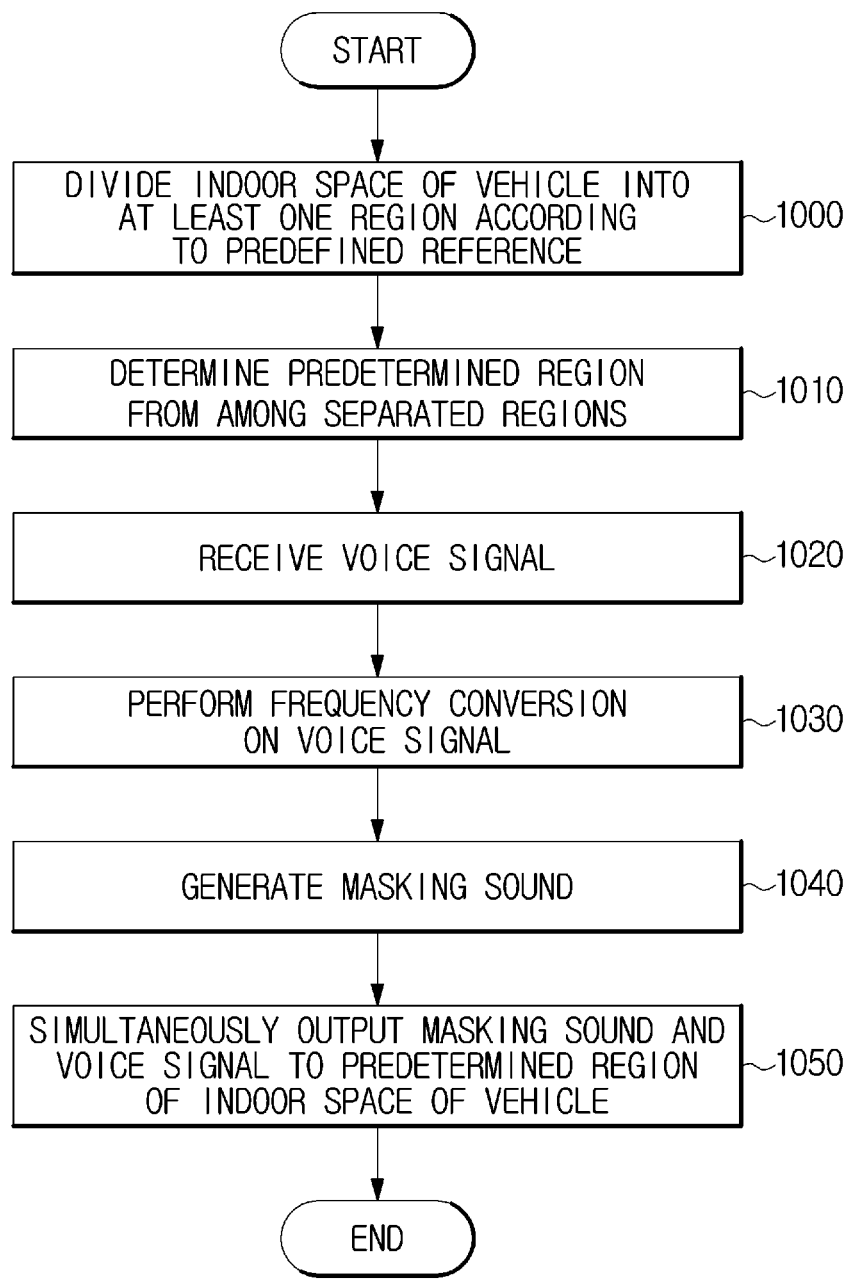
FIG. 6 is a flowchart illustrating a method for controlling the vehicle.

In one form of the present disclosure, referring to FIGS. 5 and 6, the controller 100 may divide the indoor space of the vehicle 1 into a plurality of regions according to a predefined reference (1000). In this case, the reference for dividing the internal space of the vehicle 1 into the plurality of regions may be predefined or preset, such that the predefined or preset reference may be stored in the storage unit 500 in advance.

The controller 100 may divide the indoor space of the vehicle 1 into a first region Z1 having the driver seat 301, a second region Z2 having the passenger seat 302, a third region Z3 having a back seat 303 located behind the driver seat 301, and a fourth region Z4 having another back seat 304 located behind the passenger seat 302. In this case, the driver of the vehicle 1 may be present in the first region Z1, and at least one passenger may be present in at least one of the second region Z2, the third region Z3, and the fourth region Z4.

In addition, the controller 100 may further divide the indoor space of the vehicle 1 into a fifth region Z5 having the driver seat 301 and the passenger seat 301 and a sixth region Z6 having not only the back seat 303 located behind the driver seat 301 but also the other back seat 304 located behind the passenger seat 302.

That is, the controller 100 may divide the indoor space of the vehicle 1 into one or more regions according to a predefined reference, such that the controller 100 may allow a sound signal generated from at least one speaker 400 to be output only to a specific region from among the plurality of regions.

The controller 100 may decide a predetermined region to which the sound signal generated from at least one speaker 400 is scheduled to be output, from among the plurality of regions of the indoor space of the vehicle 1.

The controller 100 may decide a specific region to which the sound signal of the speaker 400 is scheduled to be output, according to a reference predefined by the driver or passenger who rides in the vehicle 1 or according to the information received through the input part. For example, if it is predetermined that only a passenger can listen to a voice signal (such as a Bluetooth communication sound) output from the interior of the vehicle 1 and the remaining passengers other than the passenger are unable to listen to the voice signal according to setting information that is preset in the vehicle 1, the controller 100 may select one region in which the passenger acting as a target listener is present, from among the plurality of regions contained in the indoor space of the vehicle 1, and may determine the selected region to be a target region to which the speaker module 400 is scheduled to output the voice signal.

However, although the voice signal generated from at least one speaker 400 is controlled to be output only to a specific passenger who is present in a predefined region, the voice signal may also be unexpectedly output to other passengers than the specific passenger as desired.

A sound masking technology for allowing only a predefined passenger to listen to a voice signal and preventing other passengers from listening to the voice signal using a masking sound that is generated based on the voice signal received by the vehicle 1 according to one form of the present disclosure will hereinafter be described with reference to the attached drawings.

FIGS. 7 to 10 are conceptual diagrams illustrating a masking algorithm for generating a masking sound according to one form of the present disclosure.

Sound masking may refer to a sound technology for covering a specific sound with another sound that is generated in response to the specific sound. The sound masking technology is a technology for neutralizing a specific sound by generating a constant noise. In more detail, the sound masking technology is a control technology for neutralizing a specific sound by generating the same and constant white noise within all sound bandwidths belonging to audible frequencies, such that it is impossible for the remaining users other than a target user to listen to the sound as well as to recognize the sound.

That is, the controller 100 may receive a voice signal from the speakers, and may generate a masking sound corresponding to the voice signal, and may thus prevent information contained in the voice signal from being exposed to others.

Referring to FIG. 4, the voice signal receiver 360 may receive a voice signal such as a Bluetooth communication sound (1020). In more detail, the voice signal receiver 360 may receive a voice signal from an external user equipment (UE) such as a smartphone coupled to a cradle located in the indoor space of the vehicle 1, and may also receive a voice communication signal through the smartphone.

Before the voice signal receiver 360 receives the voice signal, the controller 100 may divide the indoor space of the vehicle 1 into one or more regions according to the predefined reference as shown in FIG. 5 (1000).

In addition, the controller 100 may decide a predetermined region needed to perform such sound masking from among the plurality of regions contained in the indoor space of the vehicle 1 (1010).

That is, when the indoor space of the vehicle 1 is divided into a first region Z1, a second region Z2, a third region Z3, and a fourth region Z4 as shown in FIG. 5, the driver may be located in the first region Z1 and the passenger may be located in the fourth region Z4. In this case, according to user setting information, in order to allow only the passenger who is present in the fourth region Z4 to listen to a Bluetooth voice communication signal received by the voice signal receiver 360 as well as to prevent the driver who is present in the first region Z1 from listening to the Bluetooth voice communication signal, the controller 100 may perform sound masking for the driver who is present in the first region Z1.

For this purpose, the controller 100 may control a masking sound generated as will be described later to be output to a predefined region (e.g., the first region in which the driver is located) of the indoor space of the vehicle 1.

The frequency converter 370 may perform frequency conversion on the voice signal received by the voice signal receiver 360 upon receiving a control signal from the controller 100 (1030). That is, since the voice signals having the same frequency may have different sound volumes according to categories of the voice signals, unique characteristics of individual frequencies of a voice signal of another party need to be analyzed for sound masking.

For this purpose, the frequency band separator 380 may separate a frequency band of the voice signal converted by the frequency converter 370. That is, the controller 100 may generate a masking sound based on the frequency band separated by the frequency band separator 380 (1040).

The controller 100 may amplify the magnitude of a voice signal having a predetermined frequency band or greater on the basis of the frequency band of the frequency-converted voice signal, thereby generating a masking sound.

Figure 7:
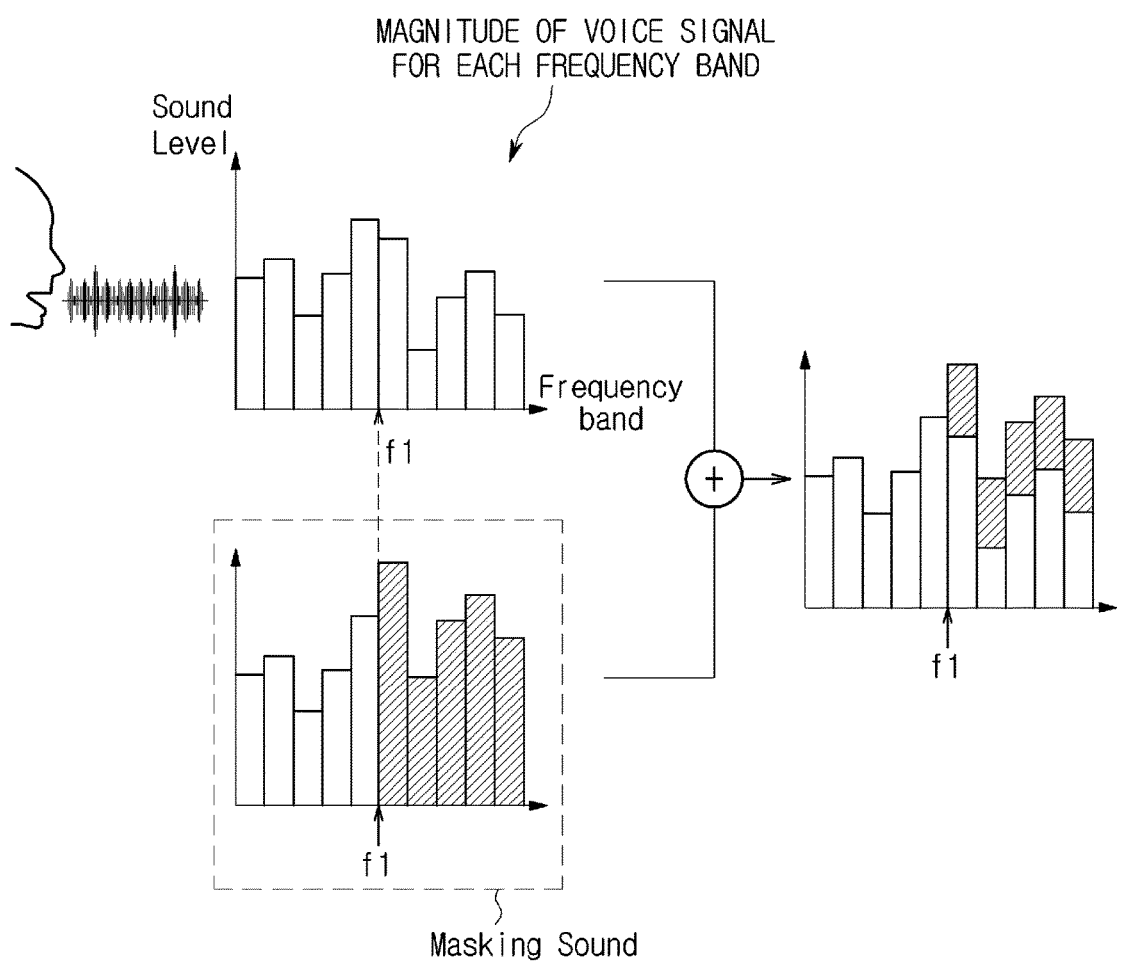
FIGS. 7 to 10 are conceptual diagrams illustrating a masking algorithm for generating a masking sound.

Referring to FIG. 7, the controller 100 may amplify the magnitude of a voice signal having a predetermined frequency (f1) or higher from among the frequency band of the frequency-converted voice signal, thereby generating a masking sound. That is, the controller 100 may amplify the magnitude of the voice signal about the frequency band having a predetermined frequency (f1) or higher from among Bluetooth communication voice signals received by the voice signal receiver 360, thereby generating a masking sound. That is, the controller 100 may amplify the magnitude of a sound signal having a specific frequency or higher from among the caller's voice signal received as a communication sound, such that the controller 100 may generate a masking sound capable of preventing transmission of information contained in the caller's voice signal.

A predetermined frequency (f1) for amplifying the magnitude of a masking sound signal corresponding to the voice signal may be changed according to setting information, and the magnitude of an amplified signal may also be changed according to such setting information.

The controller 100 may generate a control signal in a manner that the generated masking sound can be output to a predetermined region of the indoor space of the vehicle 1, and may allow both the voice signal received by the voice signal receiver 360 and the masking sound to be simultaneously output to the predetermined region of the indoor space of the vehicle 1 through at least one speaker 400 (1050).

That is, as described above, in order to prevent the driver who is present in the first region Z1 from listening to the voice signal contained in the Bluetooth communication sound received by the vehicle 1, as well as to allow only a passenger who is present in the fourth region Z4 to listen to the voice signal, the controller 100 may control at least one speaker 400 in a manner that the generated masking sound can be output to the first region Z1.

Referring to FIG. 7, when the controller 100 simultaneously outputs the Bluetooth communication voice signal and the masking sound to the first region Z1 by amplifying the magnitude of a voice signal having a predetermined frequency band or higher, the driver who is present in the first region Z1 can simultaneously listen to not only pure Bluetooth communication voice signals but also the masking sound, such that the driver may have difficulty in listening to information contained in the Bluetooth communication voice signals.

That is, since the masking sound and the voice signal are simultaneously output, information contained in the voice signal having a predetermined frequency band or higher may not be transmitted to the driver, or information contained in the voice signal may be distorted, such that the driver is unable to recognize the Bluetooth communication voice signal.

Therefore, only the passenger who is present in the fourth region Z4 can listen to information contained in the Bluetooth communication voice signal received by the vehicle 1, and the other passenger who is present in the first region Z1 is unable to listen to the above information contained in the Bluetooth communication voice signal.

The controller 100 may generate the masking sound, the magnitude of which is identical to that of the voice signal having a predetermined frequency band, on the basis of the frequency band of the frequency-converted voice signal.

Figure 8:
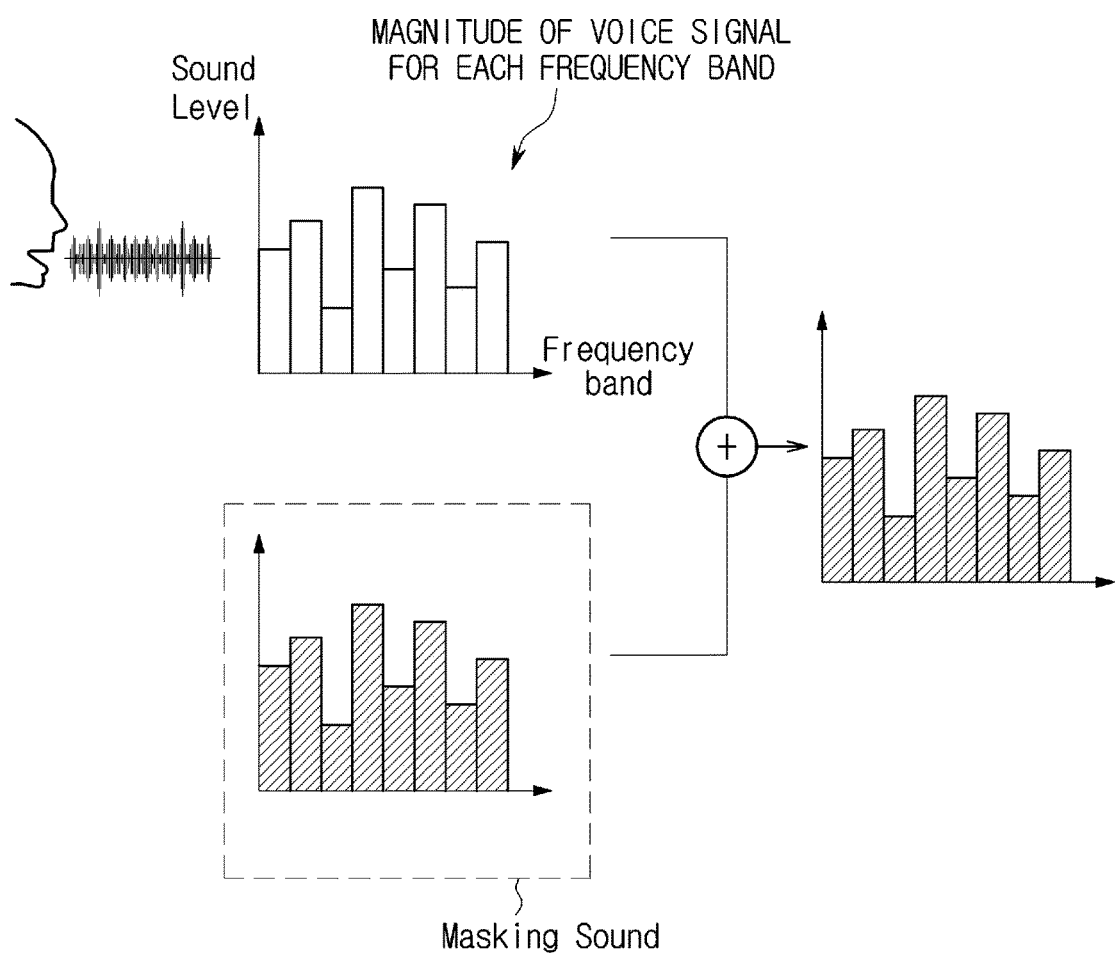

Referring to FIG. 8, the controller 100 may generate a masking sound, the magnitude of which is identical to that of a voice signal having the entire frequency band, according to individual frequency bands, such that the masking sound may be generated for each frequency band. That is, in association with the entire frequency band of the Bluetooth communication voice signal received by the voice signal receiver 360, the controller 100 may generate babble noise, the magnitude of which is identical to that of the Bluetooth communication voice signal, such that the controller 100 can generate a masking sound for preventing information contained in the caller's voice signal from being transmitted to others.

The magnitude of a masking sound signal for each frequency band may be changed according to the magnitude of the frequency-converted voice signal.

The controller 100 may generate a control signal in a manner that the generated masking sound can be output to a predetermined region of the indoor space of the vehicle 1, and the voice signal received by the voice signal receiver 360 and the masking sound can be simultaneously output to the predetermined region of the indoor space of the vehicle 1 through at least one speaker 400.

Referring to FIG. 8, if the masking sound having the same magnitude as the voice signal having the entire frequency band is output to the first region Z1 and at the same time the Bluetooth voice communication signal is also output to the first region Z1, the driver who is present in the first region Z1 is unable to listen to only a pure Bluetooth communication voice signal and can simultaneously listen to not only the pure Bluetooth communication voice signal but also the masking sound having the same magnitude according to frequency bands of the voice signal, such that the driver is unable to recognize information contained in the voice signal.

In other words, the controller 100 may generate the babble noise having the same magnitude within all sound bandwidths belonging to audible frequencies of the Bluetooth communication voice signal, and may neutralize the voice signal applied to the first region Z1 using the babble noise, such that the controller 100 may prevent the driver who is present in the first region Z1 from listening to the voice communication signal or from recognizing the voice communication signal.

Therefore, only the passenger who is present in the fourth region Z4 can listen to information contained in the Bluetooth communication voice signal received by the vehicle 1, and the other passenger who is present in the first region Z1 cannot listen to the above information contained in the Bluetooth communication voice signal.

The controller 100 may amplify or reduce the magnitude of a voice signal having a predetermined frequency band on the basis of a frequency band of the frequency-converted voice signal, thereby generating a masking sound.

Figure 9:
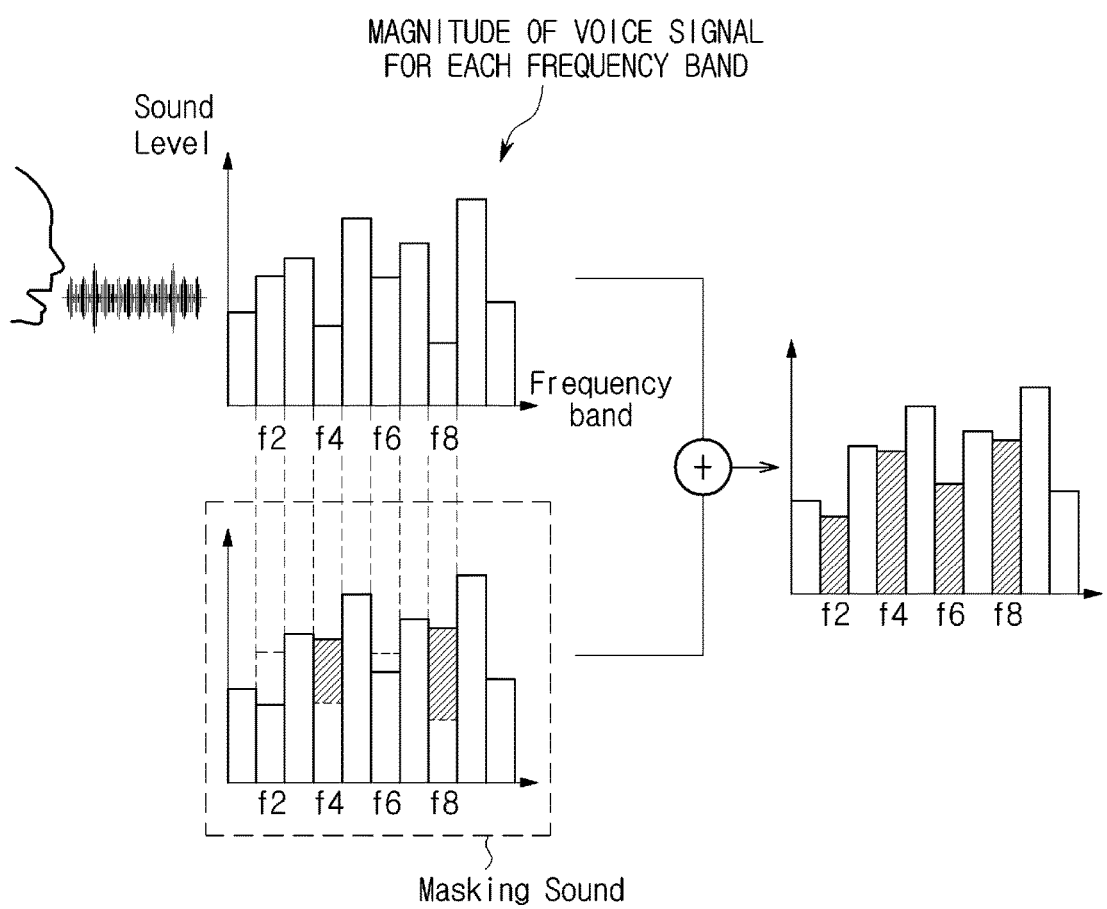

Referring to FIG. 9, the controller 100 may amplify the magnitude of the voice signal having specific frequency bands f4 and f8 from among frequency bands of the frequency-converted voice signal, and may reduce the magnitude of the voice signal having other frequency bands f2 and f6, thereby generating a masking sound.

Referring to FIG. 9, the controller 100 may cause distortion of information contained in the voice signal having specific frequency bands f4 and f8 corresponding to the frequency bands of the voice signal, using the masking sound through which the magnitude of the voice signal having specific frequency bands f4 and f8 corresponding to the frequency band of the voice signal is amplified in a manner that the amplified magnitude of the voice signal is higher than the magnitude of the signal corresponding to the frequency bands f4 and f8 of the voice signal by a predetermined value or higher.

Likewise, the controller 100 may prevent transmission of information contained in the voice signal having the corresponding frequency bands f2 and f6 using a masking sound through which the magnitude of the voice signal having specific frequency bands f2 and f6 corresponding to frequency bands of the voice signal can be reduced more than the magnitude of the signal corresponding to the frequency bands f2 and f6 of the voice signal by a predetermined value or greater.

The predetermined frequencies (f2, f4, f6, f8) for amplifying or reducing the magnitude of the masking sound corresponding to the voice signal may be changed according to setting information, or the magnitude of the amplified or reduced signal may also be changed according to such setting information.

The controller 100 may generate a control signal in a manner that the generated masking sound is output to a predetermined region of the indoor space of the vehicle 1, and may control the voice signal received by the voice signal receiver 360 and the masking sound to be simultaneously output to the predetermined region of the indoor space of the vehicle 1 through at least one speaker 400.

As shown in FIG. 9, if not only the Bluetooth communication voice signal, but also the masking sound for amplifying or reducing the magnitude of the voice signal in response to specific frequency bands (f2, f4, f6, f8) of the voice signal is simultaneously output to the first region Z1, the driver who is present in the first region Z1 may listen to the Bluetooth communication voice signal and the masking sound by which the magnitude of a signal having specific frequency bands (f2, f4, f6, f8) from among the entire voice signal is amplified or reduced.

Therefore, the driver who is present in the first region Z1 cannot listen to information contained in the specific frequency bands (f2, f4, f6, f8) of the voice signal, such that the driver is unable to recognize the entire content of the voice communication signal. Accordingly, only the passenger who is present in the fourth region Z4 can listen to information contained in the Bluetooth communication voice signal received by the vehicle 1, and the driver who is present in the first region Z1 is unable to listen to the above information contained in the Bluetooth communication voice signal.

After the voice signal is frequency-converted by the frequency converter 370 and a frequency band of the resultant voice signal is separated (or isolated) by the frequency band separator 380, the controller 100 may receive the frequency band of the separated voice signal, may change the position of the frequency band of the separated voice signal, and may thus generate a masking sound based on the changed position of the frequency band.

Figure 10:
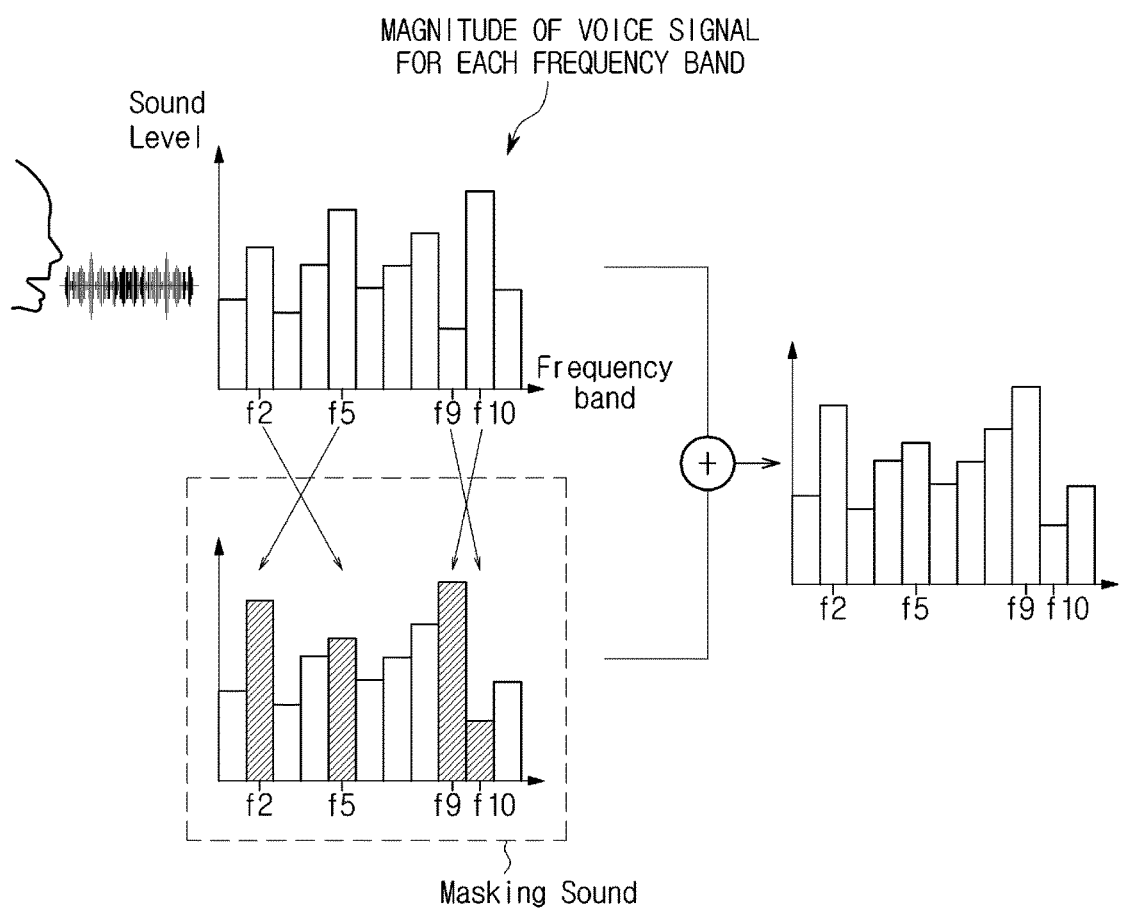

Referring to FIG. 10, the controller 10 may separate specific frequency bands (f2, f5, f9, f10) from the frequency bands of the voice signal, and may change the position of the voice signal having the corresponding frequency bands (f2, f5, f9, f10) of the masking sound that is generated in a manner that signals of individual frequency bands of the voice signal have the same magnitude, thereby generating a masking sound.

Referring to FIG. 10, the controller 100 may generate a masking sound for changing the position of the voice signal corresponding to a frequency band (f2) and the position of the other signal corresponding to a frequency band (f5) from among the separated frequency bands (f2, f5, f9, f10) of the voice signal, such that information contained in the voice signal having the corresponding frequency bands (f2, f5) may be distorted.

As illustrated in FIG. 10, the controller 100 may generate the masking sound for changing not only the voice signal corresponding to the frequency band (f9) but also the voice signal corresponding to the frequency band (f10) from among the separated frequency bands (f2, f5, f9, f10) of the voice signal, such that information contained in the voice signal having the corresponding frequency bands (f9, f10) may be distorted.

That is, the controller 100 may generate a masking sound that is capable of changing the position of specific information contained in each frequency band of the Bluetooth communication voice signal received by the vehicle 1, such that the controller 100 may prevent transmission of information contained in the voice signal corresponding to the changed frequency band.

A specific frequency band of the signal for changing the position of the voice signal to generate the masking sound may be changed according to setting information, and the position of a voice signal for each frequency band to be changed may also be changed.

Figure 11:
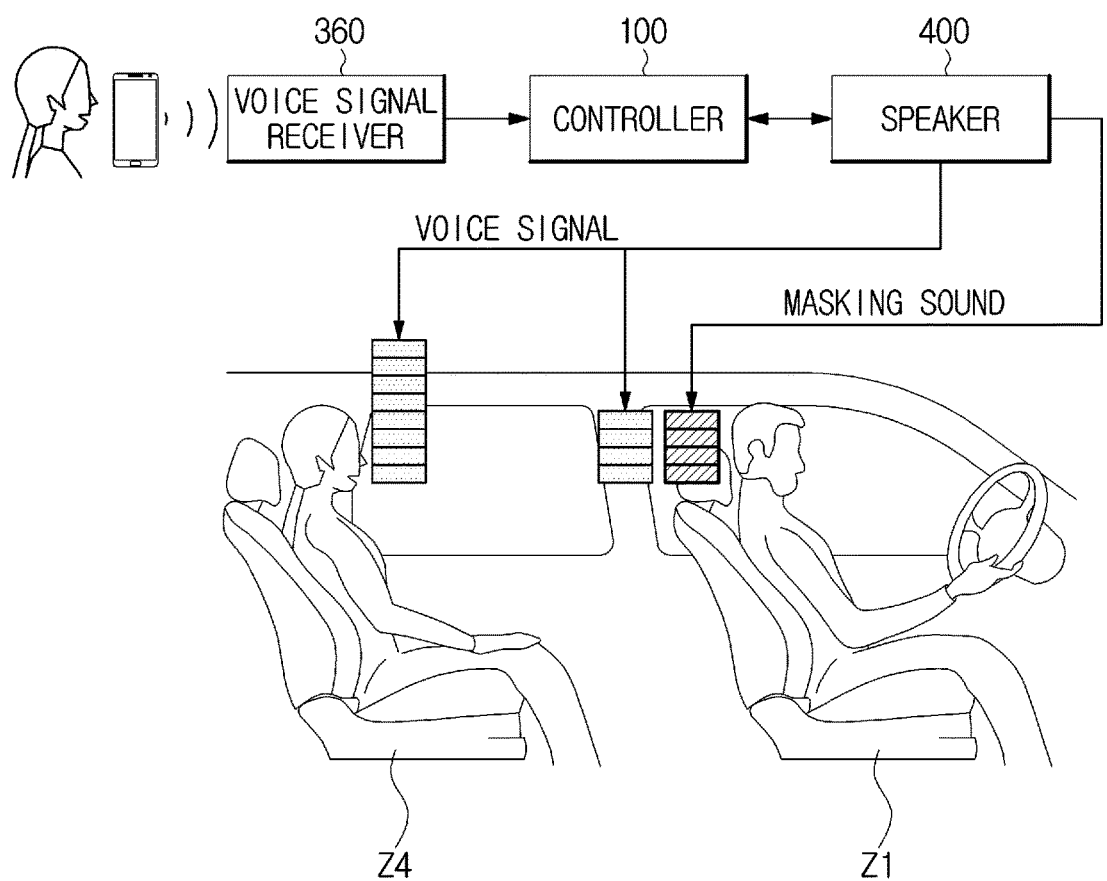
FIG. 11 is a conceptual diagram illustrating a method for outputting a masking sound to a predetermined region from among the indoor space of the vehicle.

FIG. 11 is a conceptual diagram illustrating a method for outputting a masking sound to a predetermined region from among the indoor space of the vehicle according to another form of the present disclosure.

Referring to FIG. 11, the voice signal receive 360 may receive the voice signal contained in the Bluetooth communication sound, and the controller 100 may generate a masking sound for preventing transmission of information contained in the voice signal according to the frequency band of the received voice signal.

The controller 100 may control at least one speaker 400 such that the generated masking sound and the received voice signal can be simultaneously output to the predetermined region of the indoor space of the vehicle 1.

Referring to FIG. 11, when the indoor space of the vehicle 1 is divided into the first to fourth regions Z1 to Z4, the controller 100 may simultaneously output the voice signal and the masking sound to the first region Z1 in which the driver is located, and may output only the voice signal to the fourth region Z4 in which the passenger is located.

In this case, although the Bluetooth communication voice signal received by the voice signal receiver 260 is output to both the first region Z1 and the fourth region Z4, the masking sound generated by the controller 100 is output to the first region Z1, such that the driver who is present in the first region Z1 cannot listen to content of the voice communication signal and only the passenger who is present in the fourth region Z4 can listen to the content of the voice communication signal. In other words, the controller 100 may neutralize the voice signal that is output to the first region Z1 using the generated masking sound, such that the controller 100 may prevent the driver who is present in the first region Z1 from listening to the voice communication signal.

Therefore, the controller 100 can allow only a specific passenger from among all passengers of the vehicle 1 to listen to a voice signal (such as a dial tone) that is output to the indoor space of the vehicle 1, and can prevent the remaining passengers other than the specific passenger from listening to the voice signal, resulting in personal privacy protection.

The above-mentioned forms may be implemented in the form of a recording medium storing commands capable of being executed by a computer system. The commands may be stored in the form of program code. When the commands are executed by the processor, a program module is generated by the commands so that the operations of the disclosed forms may be carried out. The recording medium may be implemented as a computer-readable recording medium.

The computer-readable recording medium includes all kinds of recording media storing data readable by a computer system. Examples of the computer-readable recording medium include a Read Only Memory (ROM), a Random Access Memory (RAM), a magnetic tape, a magnetic disk, a flash memory, an optical data storage device, etc.

As is apparent from the above description, the vehicle and a method for controlling the same according to the forms of the present disclosure may allow only a specific passenger from among all passengers who ride in a vehicle to listen to a voice communication signal such as a dial tone that is output to an indoor space of the vehicle, and may prevent the remaining passengers other than the specific passenger from listening to the voice communication signal, such that user privacy in in-vehicle telephone communication can be protected.

Although a few forms of the present disclosure have been shown and described, it would be appreciated by those skilled in the art that changes may be made in these forms without departing from the principles and spirit of the present disclosure.

What is claimed is:

1. A vehicle comprising:
a voice signal receiver configured to receive a voice signal;
at least one speaker provided in the vehicle and configured to output the voice signal; and
a controller configured to:
perform frequency conversion of the received voice signal,
generate a masking sound for inhibiting transmission of information contained in the voice signal based on a frequency band of the converted voice signal,
generate a control signal and cause the generated masking sound to be output to a predetermined region of an indoor space of the vehicle, and
amplify a magnitude of the voice signal having a predetermined frequency band or higher based on the frequency band of the converted voice signal, thereby generating the masking sound.

2. The vehicle according to claim 1, wherein the controller is configured to divide the indoor space of the vehicle into a plurality of regions based on a predetermined reference, and cause the generated masking sound to be output to the predetermined region among the plurality of regions.

3. The vehicle according to claim 1, wherein the controller is configured to generate the control signal and cause the generated masking sound and the voice signal to be simultaneously output to the predetermined region of the indoor space of the vehicle through the at least one speaker.

4. The vehicle according to claim 1, wherein the controller is configured to generate the masking sound having the same magnitude as the voice signal having the predetermined frequency band based on the frequency band of the converted voice signal.

5. The vehicle according to claim 1, wherein the controller is configured to reduce the magnitude of the voice signal having the predetermined frequency band based on the frequency band of the converted voice signal, thereby generating the masking sound.

6. The vehicle according to claim 1, wherein the controller is configured to separate the frequency band of the converted voice signal, and change a position of the frequency band of the separated voice signal, thereby generating the masking sound.

7. The vehicle according to claim 1, wherein the at least one speaker is configured to output the generated masking sound to the predetermined region of the indoor space of the vehicle.

8. A method for controlling a vehicle, the method comprising:
receiving a voice signal;
performing frequency conversion of the received voice signal;
generating a masking sound for inhibiting transmission of information contained in the voice signal based on a frequency band of the converted voice signal; and
generating a control signal and outputting the generated masking sound to a predetermined region of an indoor space of the vehicle,
wherein generating the masking sound includes:
amplifying a magnitude of the voice signal having a predetermined frequency band based on the frequency band of the converted voice signal, and thus generating the masking sound.

9. The method according to claim 8, further comprising:
dividing the indoor space of the vehicle into a plurality of regions based on a predetermined reference; and
outputting the generated masking sound to the predetermined region among the plurality of regions.

10. The method according to claim 8, further comprising:
controlling at least one speaker embedded in the vehicle to output the voice signal, wherein generating the control signal includes:
simultaneously outputting the generated masking sound and the voice signal to the predetermined region of the indoor space of the vehicle.

11. The method according to claim 8, wherein generating the masking sound includes:
generating the masking sound having the same magnitude as the voice signal having the predetermined frequency band based on the frequency band of the converted voice signal.

12. The method according to claim 8, wherein generating the masking sound further includes:
   reducing the magnitude of the voice signal having the predetermined frequency band based on the frequency band of the converted voice signal, thereby generating the masking sound.

13. The method according to claim 8, wherein generating the masking sound includes:
   separating the frequency band of the converted voice signal; and
   changing a position of the frequency band of the separated voice signal, thereby generating the masking sound.

\* \* \* \* \*